United States Patent Office 3,424,748
Patented Jan. 28, 1969

3,424,748
PHENTHIAZINE DERIVATIVES
Daniel Farge, Thiais, Claude Jeanmart, Brunoy, and Mayer Naoum Messer, Sceaux, France, assignors to Rhone-Poulenc S.A., Paris, France, a French body corporate
No Drawing. Filed Oct. 21, 1966, Ser. No. 588,316
Claims priority, application France, Oct. 22, 1965, 35,997; Aug. 25, 1966, 74,150
U.S. Cl. 260—243  8 Claims
Int. Cl. A61k 27/00; C07d 93/14

ABSTRACT OF THE DISCLOSURE

The invention provides new aminoalkyl esters of (3-phenthiazinyl)-acetic and 2-(3-phenthiazinyl)propionic acids, the phenthiazine nucleus being optionally substituted in the 7- and/or 10-positions. These new compounds and their salts have useful pharmacodynamic properties, especially as anti-inflammatory, anti-rheumatic and spasmolytic agents.

---

This invention relates to new therapeutically useful phenthiazine derivatives, to processes for their preparation and pharmaceutical compositions containing them.

According to the present invention, there are provided the new phenthiazine derivatives of the general formula:

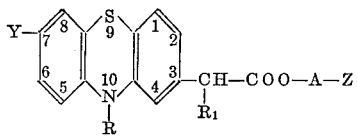

wherein R represents a hydrogen atom or the methyl group, $R_1$ represents a hydrogen atom or a methyl or ethyl group, A represents a straight or branched alkylene group containing 2 to 5 carbon atoms, Y represents a hydrogen or halogen atom, or an alkyl or alkoxy group containing 1 to 4 carbon atoms, and Z represents an amino, monoalkylamino or dialkylamino group in which the alkyl groups contain 1 to 4 carbon atoms, and acid addition and quaternary ammonium salts thereof. These new phenthiazine compounds possess useful pharmacodynamic properties; they are particularly useful as anti-inflammatory, and anti-rheumatic agents and have given good results in physiological tests on animals in doses of from 10 mg. to 100 mg. per kilogramme of animal. Compounds of importance are those of Formula I in which R is as defined above, $R_1$ represents a hydrogen atom or a methyl group, A represents ethylene or trimethylene, Y represents a hydrogen atom or a methoxy group, and Z represents an amino or dialkylamino group and, more particularly, 3-dimethylaminopropyl (3-phenthiazinyl)-acetate, 2-diethylaminoethyl 2-(10-methyl-3-phenthiazinyl)propionate, 2-aminoethyl 2-(10-methyl-3-phenthiazinyl)propionate, 2-diethylaminoethyl (10-methyl-3-phenthiazinyl)acetate, 2-aminoethyl (10-methyl-3-phenthiazinyl)acetate and 2-diethylaminoethyl 2-(7-methoxy-10-methyl-3-phenthiazinyl)propionate, and non-toxic acid addition or quaternary ammonium salts thereof.

According to a feature of the invention, the phenthiazine derivatives of Formula I are prepared by transesterification of the phenthiazine derivatives of the general formula:

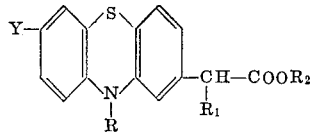

wherein R, $R_1$ and Y are as hereinbefore defined and $R_2$ represents an alkyl group containing from 1 to 4 carbon atoms, with an aminoalcohol of the general formula:

$$HO—A—Z \qquad \text{III}$$

wherein A and Z are as hereinbefore defined. The operation is carired out under the usual conditions of transesterification reactions, preferably employing an excess of aminoalcohol of Formula III and distilling the alkanol formed during the course of the reaction.

When it is desired to obtain products of Formula I in which Z represents an amino or monoalkylamino group, the transesterification reaction is preferably carried out with an aminoalcohol of the Formula III whose group Z has previously been protected by reaction with one of the products usually employed for the protection of the amine function. For example, the aminoalcohol of the Formula III may be converted into a Schiff's base by reaction with a carbonyl derivative. The transesterification is then effected between a phenthiazine derivative of the Formula II and an aminoalcohol of Formula III thus protected, whereafter the transesterification product is treated to regenerate the amine function by applying methods usually adopted for this purpose.

Phenthiazine derivatives of Formula I are also prepared, according to another feature of the invention, by the reaction of a phenthiazine derivative of the general formula:

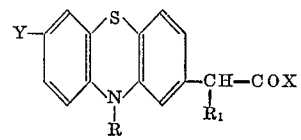

wherein R, $R_1$ and Y are as hereinafter defined and X represents a halogen atom, preferably a chlorine atom, with an aminoalcohol of Formula III. The reaction is advantageously carried out by heating the phenthiazine derivative of Formula IV, optionally prepared in situ, with the aminoalcohol of Formula III in an aromatic hydrocarbon, for example benzene.

For this process also, when it is desired to obtain products of Formula I in which Z represents an amino or monoalkylamino group, it is preferable to carry out the reaction with an aminoalcohol of the Formula III whose group Z has previously been protected by reaction with one of the products usually employed for the protection of the amine function. As protective grouping, there is preferably employed the benzyloxycarbonyl group. The reaction is then carried out between a phenthiazine derivative of Formula IV and an aminoalcohol of Formula III thus protected, whereafter the condensation product is treated to regenerate the amine function, applying methods usually adopted for this purpose, for example, by catalytic hydrogenation in the presence of palladium on carbon as catalyst.

Phenthiazine derivatives of Formula II and IV may be prepared from the corresponding acids of the general formula:

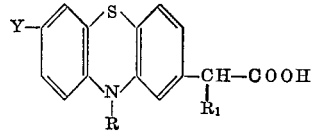

wherein R, $R_1$ and Y are as hereinbefore defined. The usual methods of esterification of acids and of producing acid chlorides may be employed for this purpose.

When $R_1$ represents a hydrogen atom, phenthiazine derivatives of Formula V may be prepared, for example, by the method described by S. P. Massie et coll., J. Org.

Chem. 21 1006 (1956) for the preparation of 3-phenthiazinylacetic acid, i.e. by subjecting ketones of the general formula:

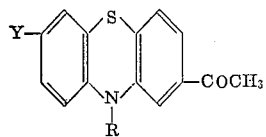

VI wherein R and Y are as hereinbefore defined, to a Willgerodt reaction followed by hydrolysis of the amides or thioamides thus formed.

When $R_1$ represents a methyl or ethyl radical, the phenthiazine derivatives of Formula V may be prepared by simultaneous hydrolysis and decarboxylation of the phenthiazine derivatives of the general formula:

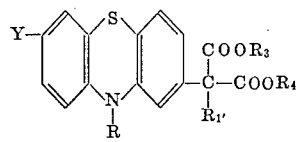

VII wherein R and Y are as hereinbefore defined, $R_1$, represents a methyl or ethyl group, and $R_3$ and $R_4$ represent alkyl groups containing from 1 to 4 carbon atoms. This reaction is performed by the usual methods of simultaneous hydrolysis and decarboxylation of malonic esters; advantageously, sodium hydroxide is employed as the reagent and ethanol as solvent.

Phenthiazine derivatives of Formula VII may be obtained by the action of a reactive ester of the general formula:

$$X_1—R_{1'}$$ VIII wherein $R_{1'}$ is as hereinbefore defined and $X_1$ represents a reactive ester residue, with a phenthiazine derivative of the general formula:

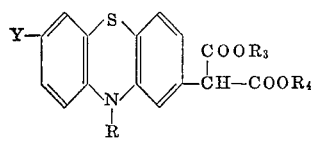

IX wherein R, Y, $R_3$ and $R_4$ are as hereinbefore defined. In the ester of Formula VIII, X may be, for example, a halogen atom or a sulphuric ester residue (e.g. methoxysulphonyloxy) or a sulphonic ester residue (e.g. methanesulphonyloxy or toluene-p-sulphonyloxy).

This reaction is carried out by the usual methods of alkylating malonic esters, i.e. by operating in the presence of a basic condensing agent, such as an alkali metal alcoholate, an alkali metal amide or an alkali metal, in an organic solvent such as benzene, toluene, ethanol or diethyl ether.

Phenthiazine derivatives of Formula IX may be prepared from phenthiazine derivatives of the general formula:

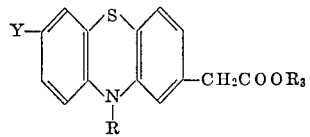

X wherein Y, R and $R_3$ are as hereinbefore defined, either directly by the action of an alkyl carbonate of the general formula:

$$R_4—O—CO—O—R_4$$ XI wherein $R_4$ is as hereinbefore defined, or by the action of an alkyl oxalate of the general formula:

$$(COOR_4)_2$$ XII wherein $R_4$ is as hereinbefore defined, followed by a decarbonylation.

The new phenthiazine derivatives of Formula I obtained according to the foregoing processes may be purified by physical methods such as distillation, crystallisation or chromatography, or by chemical methods such as the formation of salts, crystallisation of the salts and decomposition of them in an alkaline medium. In the said chemical method, the nature of the anion of the salt is immaterial, the only requirement being that the salt must be well-defined and readily crystallisable.

The new phenthiazine derivatives may be converted in manner known per se into acid addition and quaternary ammonium salts. The acid addition salts may be obtained by the action of acids on the new phenthiazine derivatives in appropriate solvents. As organic solvents there may be used, for example, alcohols, ethers, ketones or chlorinated hydrocarbons. The salt which is formed is precipitated, if necessary after concentration of its solution, and is separated by filtration or decantation. The quaternary ammonium salts may be obtained by the action of esters on the phenthiazine derivatives, optionally in an organic solvent, at room temperature or, more rapidly, with gentle heating.

For therapeutic purposes the bases of Formula I are employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, maleates, fumarates, theophyllineacetates, salicylates, phenolphthalinates, or methylene-bis-β-hydroxynaphthoates) so that the beneficial physiological properties inherent in the bases are not vitiated by side-effects ascribable to the anion. Similarly, they may also be employed in the form of non-toxic quaternary ammonium salts obtained by reaction with organic halides (e.g. methyl, ethyl, allyl or benzyl chloride, bromide, or iodide), or other reactive esters, e.g. methyl or ethyl sulphates, benzenesulphonates or toluene-p-sulphonates.

The following examples illustrate the invention.

EXAMPLE I

A mixture of methyl (3-phenthiazinyl)acetate (27.1 g.), 3-dimethylaminopropanol (15.4 g.) and sodium (0.1 g.) in cyclohexane (1000 cc.) is heated under reflux for 13 hours, the methanol formed being separated by azeotropic distillation. A slight amount of an insoluble material is thereafter filtered off and the filtrate is extracted with 10% acetic acid (300 cc.). The acetic acid extract is made alkaline with ammonia ($d=0.92$; 50 cc.). An oil separates, which is extracted with methylene chloride (400 cc.). The organic extracts are washed with a saturated aqueous sodium chloride solution (200 cc.) and then dried over anhydrous sodium sulphate. The volatile products are driven off under reduced pressure (20 mm. Hg) to yield a brown oil (20 g.). This oil is dissolved in acetone (200 cc.), and 2.4 N ethereal hydrogen chloride (26 cc.) is added. A product crystallises, which is separated by filtration. There is thus collected a product (16.1 g.) melting at about 154° C., which is recrystallised from acetonitrile (130 cc.) to give 3-dimethylaminopropyl (3-phenthiazinyl)acetate hydrochloride (12.7 g.), melting at 157° C.

Methyl (3-phenthiazinyl)acetate is prepared in accordance with S. P. Massie, I. Cooke and W. A. Hills, J. Org. Chem. 21, 1006 (1956).

EXAMPLE II

Methyl 2-(10-methyl-3-phenthiazinyl)propionate (11.9 g.), 2-diethylaminoethanol (7.04 g.), sodium (0.2 g.) and cyclohexane (600 cc.) are heated under reflux for 26 hours. The cyclohexane is thereafter evaporated under reduced pressure (20 mm. Hg), and the residue is taken up in diethyl ether (250 cc.) and water (250 cc.). The ethereal layer is decanted, and the aqueous phase is extracted with diethyl ether (300 cc.). The organic extracts are combined and washed with water until neutral. The ethereal solution is treated with N hydrochloric acid (300 cc.). The aqueous solution is decanted, washed with diethyl ether and made alkaline with 6 N sodium hydroxide (60 cc.). An oil separates, which is extracted with diethyl ether. The organic solution is dried over anhydrous sodium sulphate and the solvent is evaporated under reduced pressure (40 mm. Hg). The oily residue (7 g.) is dissolved in ethyl acetate (25 cc.) and the solution obtained is mixed with a solution of anhydrous oxalic acid (1.8 g.) in ethyl acetate (295 cc.). A solid product precipitates, which is separated by filtration and dried in vacuo over sulphuric acid. There is obtained a product (7.2 g.) which, after recrystallisation from ethyl acetate, yields the acid oxalate of 2-diethylaminoethyl 2-(10-methyl-3-phenthiazinyl)propionate (2.2 g.) solvated with ethyl acetate and melting at 89–90° C.

Methyl 2 - (10-methyl-3-phenthiazinyl)propionate employed as starting material is prepared in the following way:

A mixture of 2 - (10-methyl-3-phenthiazinyl)propionic acid (72.9 g.), methanol (24.6 g.), methanesulphonic acid (3.6 cc.) and 1,2-dichloroethane (75 cc.) is heated under reflux for 1 hour, and then a saturated sodium bicarbonate solution (100 cc.) and methylene chloride (550 cc.) are added. The organic phase is decanted, washed with water (450 cc.), treated with decolorising charcoal (20 g.), filtered, dried over anhydrous sodium sulphate and evaporated. There is thus obtained a crystalline residue (73 g.), which is recrystallised from boiling cyclohexane (250 cc.) to give methyl 2-(10-methyl-3-phenthiazinyl) propionate (64.5 g.), M.P. 70–71° C.

2 - (10 - Methyl-3-phenthiazinyl)propionic acid (M.P. 144° C.; 8.1 g.) can be prepared by heating methyl ethyl methyl (10-methyl-3-phenthiazinyl)malonate (25.6 g.) under reflux in ethanol in the presence of N sodium hydroxide (138 cc.).

Methyl ethyl methyl (10-methyl-3-phenthiazinyl)malonate (25.6 g.) is prepared by the action of methyl iodide (12.9 g.) on methyl ethyl (10-methyl-3-phenthiazinyl) malonate (27 g.) in the presence of sodium ethoxide.

Methyl ethyl (10 - methyl - 3 - phenthiazinyl)malonate (M.P. 120° C.; 27.2 g.) is obtained by the action of ethyl carbonate (73 g.) on methyl (10-methyl-3-phenthiazinyl) acetate (25 g.) in ethanol.

Methyl (10-methyl-3-phenthiazinyl)acetate (M.P. 100–101° C.; 25.6 g.) is prepared by the action of methanol (10 g.) on (10-methyl-3-phenthiazinyl)acetic acid (27.1 g.) in 1,2-dichloroethane under reflux in the presence of methanesulphonic acid.

(10-Methyl-3-phenthiazinyl)acetic acid (M.P. 146° C.; 21.4 g.) is prepared by Willgerodt's reaction (action of sulphur and morpholine, followed by hydrolysis) employing 10-methyl-3-acetylphenthiazine (43.9 g.) as starting material.

10-Methyl-3-acetylphenthiazine is prepared in accordance with G. Cauquil and A. Casadevall, Bull. Soc. Chim., p. 768 (1955).

EXAMPLE III

To a suspension of sodium 2-(10-methyl-3-phenthiazinyl)-propionate (45.4 g.) in anhydrous benzene (625 cc.) is added over a period of 20 minutes, under nitrogen, a solution of phosphorus oxychloride (12.3 g.) in benzene (100 cc.). The mixture is heated for 1½ hours at 55° C. and thereafter cooled. A solution of benzyl N-(2-hydroxyethyl)-carbamate (28.3 g.) in benzene (140 cc.) is added and the mixture, under nitrogen, is heated under reflux for 4 hours 15 minutes, and evaporated under reduced pressure (20 mm. Hg). The residue is stirred with water (750 cc.), made alkaline with 4 N ammonia (14 cc.) and then with a saturated aqueous sodium bicarbonate solution (100 cc.), and extracted with ethyl acetate (650 cc.).

The organic solution is washed with water (350 cc.), and the organic extracts are dried over anhydrous sodium sulphate, treated with decolorising charcoal (3 g.), filtered and evaporated under reduced pressure (20 mm. Hg) to give crude 2-benzyloxycarbonylaminoethyl 2-(10-methyl-3-phenthiazinyl)propionate (51 g.) in the form of an oil.

A palladium catalyst (51 g.; 2.91% palladium on charcoal) is introduced into a solution of the crude 2-benzyloxycarbonylamino - ethyl 2 - (10-methyl-3-phenthiazinyl) propionate (51 g.) in methanol (640 cc.). 3.77 N methanolic hydrogen chloride (27.8 cc.) is then added and hydrogen is bubbled through the mixture heated at 40° C. for 1 hour 40 minutes (until the evolution of carbon dioxide ceases). The catalyst is filtered off, decolorising charcoal (5 g.) added, and the mixture is again filtered and then evaporated under reduced pressure (20 mm. Hg). The residue obtained is stirred with ethyl acetate (350 cc.) while heated at 40° C. On cooling to 25° C., a lacquer is deposited, which slowly crystallises. The crystals are separated by filtration and washed with ethyl acetate (110 cc.) and then with petroleum ether (40 cc.) to give a product (24 g.) melting at about 132° C. Two recrystallisations of this product from benzene yield a product (16.5 g.) melting at 144° C. After two recrystallisations of this product (15 g.) from isopropanol, there is finally obtained 2-aminoethyl 2-(10-methyl-3-phenthiazinyl)-propionate hydrochloride (9.2 g.), M.P. 149° C.

The benzyl N-(2-hydroxyethyl)carbamate employed in this preparation is prepared in accordance with W. Gordon Rose, J. Amer. Chem. Soc., 69, 1384 (1947).

EXAMPLE IV

A solution of methyl (10-methyl-3-phenthiazinyl)acetate (28.5 g.) in cyclohexane (1 litre) is heated under reflux and 100 cc. of solvent are distilled. There is then introduced a mixture of sodium (0.1 g.) in 2-diethylaminoethanol (4 g.) and the reaction mixture is heated under reflux for 3 hours. The same treatment is repeated three times. The product is cooled, water (300 cc.) added, acidified with acetic acid (40 cc.), and the gum formed is dissolved in ethyl acetate (150 cc.). After decantation, acetic acid (35 cc.) is again added to the aqueous solution and it is washed with ethyl acetate (225 cc.). The organic solutions are combined (solution A).

The aqueous acid solution is made alkaline with ammonia (d=0.92; 70 cc.) and an oil separates. After extraction with methylene chloride (300 cc.), the product is washed with water (100 cc.), dried over anhydrous sodium sulphate and concentrated to dryness under reduced pressure (20 mm. Hg) to yield an oil (13.6 g.).

Solution A is extracted with N hydrochloric acid (300 cc.). The aqueous solution is made alkaline with ammonia (d=0.92; 55 cc.), and an oil separates. After extraction with methylene chloride (300 cc.), the product is washed with water (200 cc.), dried over anhydrous sodium sulphate and evaporated under reduced pressure (20 mm. Hg) to yield an oil (14 g.). The two oils obtained are combined; the mixture (24.8 g.) is dissolved in acetone (310 cc.) and a solution of anhydrous oxalic acid (6.04 g.) in acetone (75 cc.) is added.

The oxalate crystallises and the crystals are separated by filtration and washed with acetone (45 cc.) and then with diethyl ether (75 cc.) to give a product (22 g.) which becomes a gum at about 50° C.

The product (21 g.) is recrystallised from acetone (230 cc.) to give the acid oxalate of 2-diethylaminoethyl (10-methyl-3-phenthiazinyl)-acetate (19 g.), M.P. about 80° C.

EXAMPLE V

To a suspension of sodium (10-methyl-3-phenthiazinyl)-acetate (46.4 g.) in anhydrous benzene (720 cc.) is added over a period of 15 minutes, under nitrogen, a solution of phosphorus oxychloride (13.44 g.) in benzene (80 cc.). The mixture is then heated for 1 hour 15 minutes at 55° C., cooled and a solution of benzyl N-(2-hydroxyethyl)-carbamate (31.2 g.) in benzene (320 cc.) is added and the mixture, under nitrogen, is heated under reflux for 7 hours. The reaction mixture is concentrated to dryness under reduced pressure (20 mm. Hg) and the residue stirred with water (1 litre), made alkaline with a saturated aqueous sodium bicarbonate solution (420 cc.) and extracted with ethyl acetate (1.8 litres). The organic solution is washed with water (1.6 litres), dried over anhydrous sodium sulphate and evaporated under reduced pressure (20 mm. Hg). There is thus obtained crude 2-benzyloxycarbonylaminoethyl (10 - methyl - 3 - phenthiazinyl)acetate (63 g.) in the form of an oil.

A palladium catalyst (59 g.; 2.91% palladium on charcoal) is introduced into a solution of the crude 2-benzyloxycarbonylaminoethyl (10 - methyl-3-phenthiazinyl)acetate (59 g.) in methanol (740 cc.). 3.18 N methanolic hydrogen chloride (39.5 cc.) is then added and hydrogen is bubbled through the mixture heated at 40° C. for 1 hour (until the evolution of carbon dioxide ceases). The catalyst is filtered off, decolorising charcoal (30 g.) added, and the reaction mixture is again filtered; the filtrate is then concentrated to dryness under reduced pressure (20 mm. Hg). The residue obtained is stirred with acetone (440 cc.), and the product crystallises. The crystals are filtered off and washed with acetone (200 cc.) and diethyl ether (100 cc.) to yield a product (24.8 g.) melting at 148° C. After two crystallisations from ethanol, there is obtained 2-aminoethyl (10-methyl - 3 - phenthiazinyl)acetate hydrochloride (15.5 g.), M.P. 158° C.

EXAMPLE VI

A solution of methyl 2-(7-methoxy-10-methyl-3-phenthiazinyl)propionate (12.5 g.) in cyclohexane (600 cc.) is heated under reflux, and 100 cc. of solvent are distilled. There are then introduced sodium (0.2 g.) and 2-diethylaminoethanol (6.7 g.), and the mixture is heated under reflux for 26 hours.

The reaction mixture is evaporated under reduced pressure (20 mm. Hg) and the residue is taken up with water (250 cc.) and diethyl ether (250 cc.). After decantation, the aqueous solution is extracted with diethyl ether (100 cc.) and the organic solutions are combined and washed with water (100 cc.). The ethereal solution is extracted with N hydrochloric acid (200 cc.) and the aqueous solution obtained is washed with diethyl ether (100 cc.) and made alkaline with 4 N sodium hydroxide (100 cc.). The oil formed is extracted with diethyl ether (300 cc.) and the ethereal solution is washed with water (100 cc.), dried over anhydrous sodium sulphate, filtered and evaporated under reduced pressure (20 mm. Hg).

There is thus obtained 2-diethylaminoethyl 2-(7-methoxy-10-methyl-3-phenthiazinyl)propionate (10.5 g.), the oxalate of which, obtained in ethyl acetate, melts at about 102–104° C.

The methyl 2-(7-methoxy-10-methyl-3-phenthiazinyl)propionate employed as starting material is prepared in accordance with Example 9 of Belgian Patent No. 671,573.

The present invention includes within its scope pharmaceutical compositions containing, as active ingredient, at least one of the phenthiazine derivatives of Formula I, or non-toxic acid addition or quaternary ammonium salt thereof, in association with a pharmaceutical carrier or coating. The invention includes especially such preparations made up for oral, parenteral or rectal administration, or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suppository wax.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment.

The following examples illustrate pharmaceutical compositions according to the invention.

EXAMPLE VII

Tablets weighing 500 mg. and having the following composition are prepared in accordance with the usual methods:

| | Mg. |
|---|---|
| 3-dimethylaminopropyl (3-phenthiazinyl)acetate hydrochloride | 277 |
| Starch | 163 |
| Colloidal silica | 50 |
| Magnesium stearate | 10 |

EXAMPLE VIII

Tablets weighing 200 mg. and having the following composition are prepared in accordance with usual methods:

| | Mg. |
|---|---|
| 2-dimethylaminoethyl 2-(10-methyl-3-phenthiazinyl)propionate acid oxalate | 64 |
| Starch | 106 |
| Colloidal silica | 27 |
| Magnesium stearate | 3 |

EXAMPLE IX

Tablets weighing 500 mg. and having the following composition are prepared in accordance with usual methods:

| | Mg. |
|---|---|
| 2-aminoethyl 2 - (10-methyl-3-phenthiazinyl)propionate hydrochloride | 222 |
| Starch | 200 |
| Colloidal silica | 65 |
| Magnesium stearate | 13 |

EXAMPLE X

Tablets weighing 200 mg. and having the following composition are prepared in accordance with usual methods:

| | Mg. |
|---|---|
| 2-diethylaminoethyl (10-methyl - 3 - phenthiazinyl)acetate acid oxalate | 62.3 |
| Starch | 107.7 |
| Colloidal silica | 27 |
| Magnesium stearate | 3 |

We claim:
1. A phenthiazine derivative of the formula:

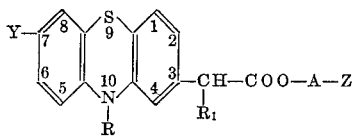

wherein R represents hydrogen or methyl, $R_1$ represents hydrogen, methyl or ethyl, A represents an alkylene group of 2 through 5 carbon atoms, Y represents hydrogen, halogen, or alkyl or alkoxy of 1 through 4 carbon atoms, and Z represents amino, monoalkylamino or dialkylamino in which each alkyl group is of 1 through 4 carbon atoms, as such or as a non-toxic acid addition or quaternary ammonium salt thereof.

2. A phenthiazine compound according to claim 1 in which R represents hydrogen or methyl, $R_1$ represents hydrogen or methyl, A represents ethylene or trimethylene, Y represents hydrogen or methoxy, and Z represents amino or dialkylamino in which each alkyl group is of 1 through 4 carbon atoms.

3. The phenthiazine compound according to claim 1 wherein R, $R_1$ and Y represent hydrogen, A represents trimethylene and Z represents dimethylamino, as such as as a non-toxic acid addition or quaternary ammonium salt thereof.

4. The phenthiazine compound according to claim 1 wherein R and $R_1$ represent methyl, A represents ethylene, Y represents hydrogen, and Z represents diethylamino, as such or as a non-toxic acid addition or quaternary ammonium salt thereof.

5. The phenthiazine compound according to claim 1 wherein R and $R_1$ represent methyl, A represents ethylene, Y represents hydrogen and Z represents amino, as such or as a non-toxic acid addition salt thereof.

6. The phenthiazine compound according to claim 1 wherein R represents methyl, $R_1$ and Y represent hydrogen, A represents ethylene and Z represents diethylamino, as such or as a non-toxic acid addition or quaternary ammonium salt thereof.

7. The phenthiazine compound according to claim 1 wherein R represents methyl, $R_1$ and Y represent hydrogen, A represents ethylene and Z represents amino, as such or as a non-toxic acid addition salt thereof.

8. The phenthiazine compound according to claim 1 wherein R and $R_1$ represent methyl, A represents ethylene, Y represents methoxy and Z represents diethylamino, as such or as a non-toxic acid addition or quaternary ammonium salt thereof.

References Cited

UNITED STATES PATENTS 3,375,248   3/1968   De Antoni _____ 260—243

HENRY R. JILES, *Primary Examiner.*

H. I. MOATZ, *Assistant Examiner.*

U.S. Cl. X.R.

424—247